UNITED STATES PATENT OFFICE.

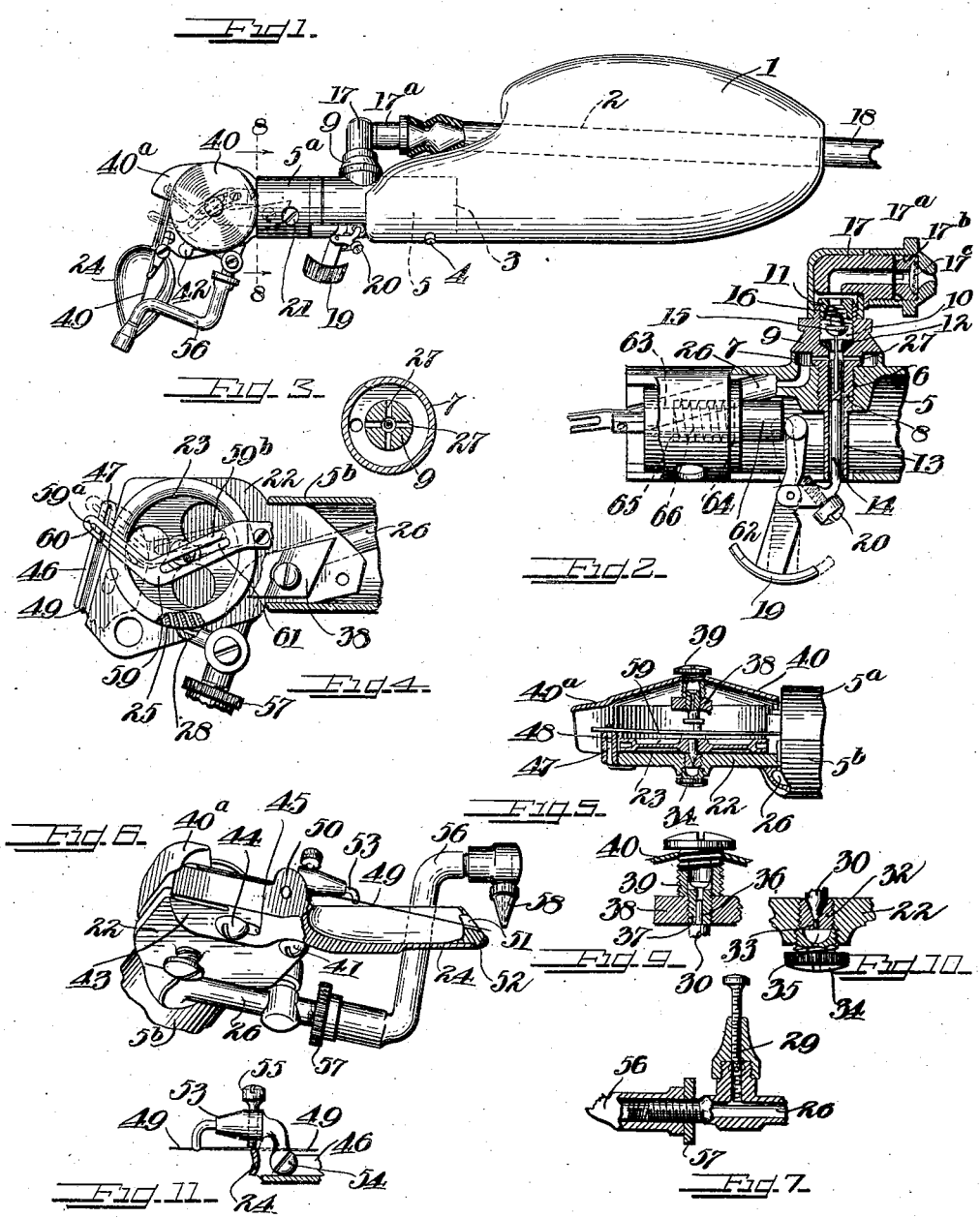

JENS A. PAASCHE, OF CHICAGO, ILLINOIS.

AIR-BRUSH.

No. 852,899.  Specification of Letters Patent.  Patented May 7, 1907.

Application filed September 8, 1906. Serial No. 333,743.

*To all whom it may concern:*

Be it known that I, JENS A. PAASCHE, a citizen of the United States, residing at Chicago, in the county of Cook and State of Illinois, have invented certain new and useful Improvements in Air-Brushes, of which the following is a specification.

The object of this invention, generally stated, is the improvement of air brushes with a view to convenience in handling, smoothness and accuracy in operation, durability and greater range of adjustability of its parts. These objects, among others, I attain in the embodiment hereinafter described of my invention by providing a handle conforming better to the hand than the cylindrical handle heretofore generally used; by making the needle-actuating bar of a sheet-steel punching instead of wire, as has been customary heretofore; by providing an improved means for adjustably mounting and firmly securing the pigment-spoon in place; by providing improved bearings for the wind-wheel shaft; by providing means for controlling the character of the line to be formed; and by the various other improved features of construction more fully pointed out hereinafter.

In the accompanying drawings Figure 1 is a side view of an air brush embodying the features of my invention. Fig. 2 is a fragmental sectional view of the air valve and the feed-controlling mechanism. Fig. 3 is a section on dotted line 3 3 of Fig. 2. Fig. 4 is a top plan view of the wind-wheel and some of the parts associated therewith. Fig. 5 is a vertical section through said wind-wheel and its inclosing cover. Fig. 6 is a perspective view, partly in section, of the forward end of the air brush. Fig. 7 is a fragmental sectional view of the air tube. Fig. 8 is a sectional view on dotted line 8 8 of Fig. 1. Figs. 9 and 10 are detail views of the bearings for the wind-wheel shaft. Fig. 11 is a detail view of the guard finger for the pigment-feeding needle.

The embodiment herein shown of my invention comprises a handle 1, of convenient form for grasping in the hand, said handle having an opening 2 extending therethrough for the reception of an air tube to be hereinafter mentioned. In the forward end of the handle 1 is a recess 3 within which is secured, by means of the pin 4, a cylindrical stem 5 which supports the mechanism of the air brush. Within a screw-threaded opening 6 in a boss 7 formed in and upon the stem 5 is secured the stem 8 of a valve seat member 9, said member having a chamber 10 therein, one end of which is partly closed by an annular spring-retaining member 11. In the other end of the chamber 10 is seated a packing ring 12 of rubber or other suitable material. An opening 13 extends longitudinally through the stem of the valve seat member 9 and communicates with the chamber 10. In said longitudinal opening is slidably mounted a valve stem 14 carrying within the chamber 11 a valve 15 adapted to be seated upon the packing ring 12. A light coiled spring 16 extending between said valve member and the spring-retaining ring 11 tends to seat said valve member, but the pressure of the air used for operating the air brush is mainly depended upon for normally holding the valve 15 seated.

To the valve seat member 9 is secured a nipple 17 arranged to be connected with a suitable source of compressed air by means of a flexible tube 18 attached to said nipple and extending through the opening 2 in the handle 1. One end of the valve stem 14, in this instance, is bent to provide means for pivotally supporting a thumb lever 19 by pressing upon which the operator may unseat the valve 15 to admit pressure air to the brush as will appear hereinafter. The thumb lever 19 is also used to operate a means for controlling the distribution of pigment, said lever for this purpose being pivotally mounted upon the valve stem 14. The extent of pivotal movement of the thumb lever 19 is regulated by means of a set screw 20 extending through said valve stem into position to limit the movement of said thumb lever in one direction.

The forward end of the stem 5 is made sectional for convenience in manufacture, the upper section $5^a$ being secured to the portion $5^b$ by means of a screw 21. To the forward end of the section $5^b$ is rigidly fixed a base plate 22, upon which is rotatably supported a wind wheel 23 and to which is adjustably secured the pigment spoon 24. The wind wheel 23 has formed in its periphery a relatively large number of buckets 25 against which the pressure fluid is directed, said fluid being conducted to a point adjacent to the periphery of said wind wheel through a tube 26 communicating with the interior of the chamber 10 through a plurality of ports 27. The passage of air through the nozzle 28 by means of which the compressed air is directed against the wind wheel is controlled by means of a valve 29, the stem of which has a screw-threaded connection with the walls of its casing.

The wind wheel 23 is rigidly mounted upon a vertical shaft 30 provided with a crank 31, the conical lower end of said shaft fitting within the cupped upper end of a bearing screw 32, said screw having a central perforation 33. The bearing screw 32 is seated within an opening in the base plate 22, the lower end of which opening is closed by means of a screw 34 having a cup 35 in its upper end. The upper end of the crank shaft 30 lies within the central perforation 36 of a bearing screw 37, said screw being carried by a bracket 38 fixed to the base plate 22. The cupped upper end of said screw is closed by a screw 39 seated in the upper wall of a cover 40 for the wind-wheel 23. In use, a quantity of a suitable lubricant is placed in the cup 35 and perforation 33 of the lower shaft bearing and in the corresponding perforation and cups of the upper bearing. The wind-wheel cover 40 is secured in place by means of a screw 41 extending through the base plate 22 into a screw-threaded tubular boss 42 fixed to said cover. Upon the forward portion of the cover 40 is formed a finger rest 40$^a$.

The pigment spoon 24 is fixed to the forward end of a plate 43 adjustably connected to the base plate 22 by means of a screw 44 passing through a slot 45 in said plate into said base plate. A needle guide 46 is rigidly connected with the plate 43, said guide having an elongated opening 47 therein in which the angular end 48 of a pigment-feeding needle 49 is arranged to slide. Intermediate its ends the needle passes between slotted guides 50 and 51. The guide 51 is secured in place by means of a stud 52 cemented or otherwise suitably fixed within an opening in the forward end of the spoon 24. The needle 49 is held from upward displacement by a guard finger 53 pivoted at 54 to the needle-guide 46, the downward movement of said finger being limited by the impingement of a stop screw 55 upon the edge of the spoon 24. An angular air tube 56 conducts the pressure air to a point near the forward end of the spoon 24, said tube being screwed upon the forward end of the air tube 26 and being held in adjusted position with relation to the pigment-feeding needle 49 by means of the lock-nut 57. The air is discharged through a nozzle 58 adjustably mounted upon the end of the tube 56.

The needle 49 is reciprocated to feed the pigment into the path of the air blast issuing from the nozzle 58 by means of an angular needle bar 59, the portion 59$^a$ of said needle bar having an elongated opening 60 therein through which the angular end 48 of the needle extends. The portion 59$^b$ of the needle bar has a similar opening 61 therein within which the crank 31 moves. The needle bar 59 is punched from sheet-steel and possesses greater rigidity than is found in bars made of wire, the material heretofore commonly used. The rear end of the needle bar 59 is pivotally connected with a plunger 62 slidably mounted in an opening 63 formed in the section 5$^a$ of the stem 5, said plunger having a shoulder 64 thereon between which and a shoulder 65 formed in the opening 63 is interposed a coiled spring 66 tending to hold the rear end of the plunger 62 against the inner end of the thumb lever.

In operation, the brush is connected with a suitable supply of compressed air by means of the flexible tube 18. Grasping the handle 1 in his right hand the operator unseats the valve 15 by pressing with his thumb upon the thumb lever 19, permitting the flow of air past said valve member through the ports 27 and the tube 26 to the wind wheel 23 and the discharge nozzle 58. The large number of buckets 25 in the wind wheel 23 makes the wheel more quickly responsive to the air pressure. The wind wheel 23 in its rotation causes the needle bar 59 to be pivotally moved and the needle 49 to be reciprocated. The coiled spring 66 acts normally to hold the needle bar 59 in such position that only the point of the needle 49 will be projected beyond the forward end of the spoon 24. When the operator desires to change the quantity of pigment being applied by the brush and the character of the line being formed, he tilts the thumb lever 19 to move the plunger 62 and the needle bar 59 forward, thereby projecting a larger portion of the needle 49 beyond the forward end of the spoon. The length of the reciprocatory movement of the needle is not thereby substantially altered, owing to the angular arrangement of the slots 60 and 61 in the needle bar 59. The adjusting screw 20 regulates the amplitude of the reciprocation of the needle 49 so that the finest line desired shall be made as soon as the air valve is opened. The adjustable mounting of the spoon 24 permits of changing the position of the spoon to correspond with variations in the size of the needles used.

When the operator desires to cut off the supply of air to the tube, he releases the valve stem 14 to the pressure of the air, the latter immediately seating the valve 15 upon the packing ring 12.

I claim as my invention:

1. In an air brush, in combination, a base plate; a plate having an adjustable connection with said base plate; and a needle guide and a pigment spoon rigidly secured to said second-mentioned plate.

2. In an air brush, in combination, a base plate; operating mechanism mounted on the